O. MAASS.
PROCESS OF SEPARATING AQUEOUS AND OTHER VAPORS FROM FLUIDS AND SOLIDS AND FOR PREPARING DILUTE SULPHURIC ACID.
APPLICATION FILED APR. 15, 1918.
1,417,618.  Patented May 30, 1922.
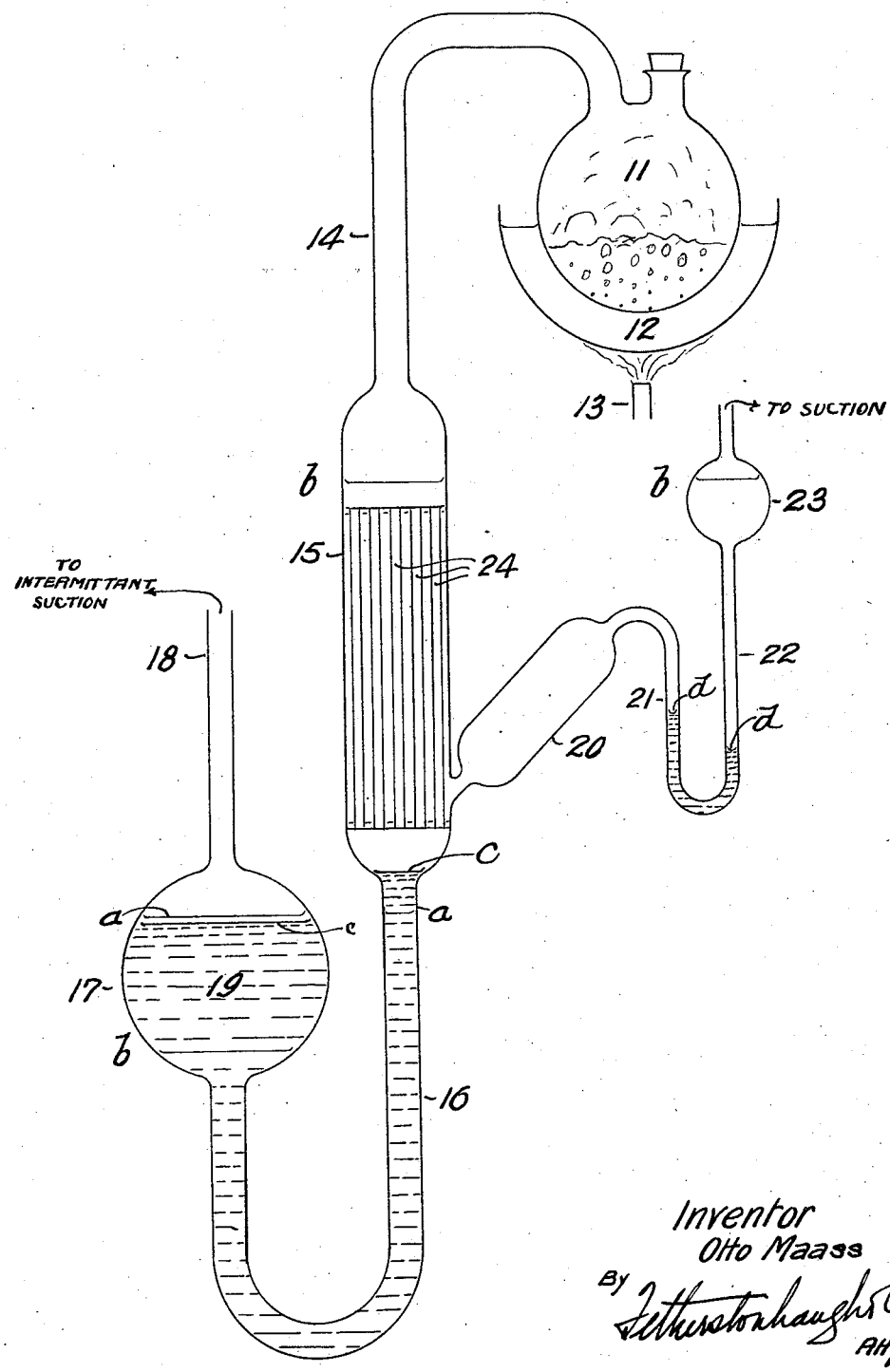

UNITED STATES PATENT OFFICE.

OTTO MAASS, OF MONTREAL, QUEBEC, CANADA.

PROCESS OF SEPARATING AQUEOUS AND OTHER VAPORS FROM FLUIDS AND SOLIDS AND FOR PREPARING DILUTE SULPHURIC ACID.

1,417,618.  Specification of Letters Patent.  Patented May 30, 1922.

Application filed April 15, 1918. Serial No. 228,733.

*To all whom it may concern:*

Be it known that I, OTTO MAASS, a subject of the King of Great Britain, and resident of the city of Montreal, in the Province of Quebec and Dominion of Canada, have invented certain new and useful Improvements in Processes of Separating Aqueous and Other Vapors from Fluids and Solids and for Preparing Dilute Sulphuric Acid, of which the following is a full, clear, and exact description.

This invention relates to a process or method of separating aqueous or other vapors from gases, liquids or solids, and the object of the invention is to provide for the very rapid extraction of the vapors under such conditions that the substance cleansed of the vapor is not affected.

At the present time, it is customary to dry gases by passing them through sulphuric acid, the aqueous moisture being absorbed by the acid. This method is quite satisfactory as a laboratory operation but for commercial use it is entirely too slow in the majority of cases. When it is desired to remove aqueous vapor from liquids or solids, a process of evaporation is resorted to, in which the rapidity of evaporation can be increased by raising the temperature of the material or lowering the atmospheric pressure. In many instances, it is not practicable to raise the temperature to any considerable degree above normal atmospheric temperatures, as the substance which it is desired to evaporate is injured or changed at the higher temperatures. In the same manner, the process of freezing out aqueous moisture cannot be always resorted to. In any event, the ordinary processes of evaporation at either high or low temperatures are tedious and expensive, and therefore unsuitable for many commercial uses.

According to this invention, abstraction of aqueous or other moisture from gases, liquids or solids may be carried on with great rapidity and at low cost, at temperatures which do not affect the material being dried. For example, chemical substances such as hydrogen peroxide, which normally exist as weak aqueous solutions, may be quickly and cheaply concentrated at temperatures which will not decompose or change the substance. From an ordinary commercial aspect, the invention is equally useful. For example, milk may be evaporated to a dry powder in a very short time and at low cost, and without raising the temperature of the milk anywhere near the point which would cause undesirable changes in it. Sulphuric acid is preferably used as the drying medium, where aqueous moisture is to be removed, and the material to be dried and the acid are confined in a closed apparatus at sub-atmospheric pressure. A peculiarity of this invention is that the sulphuric acid is used to create a vacuum in the apparatus.

In the accompanying diagram which illustrates the invention;—11 designates a receptacle containing the material to be dried and which may if desired be located in a water or other bath 12 warmed by suitable means 13. The top of the receptacle 11 is connected by an inverted U-tube 14 with the top of an elongated reservoir 15, the bottom of which is connected by a U-tube 16 with any suitably shaped reservoir 17. The top of the reservoir 17 is provided with a tube 18, through which a regularly variable pressure may be maintained on a liquid 19 in the reservoir and tube 16. This liquid is the desiccating or drying agent and may conveniently be sulphuric acid. A branch 20 leads from the bottom of the reservoir 15 and is connected at its upper end with one arm 21 of a U-tube. The other arm 22 of this tube is provided above the upper end of the branch 20 with an enlargement or receiver 23. The pressure regulating means to which the tube 18 is connected is preferably an apparatus giving alternate sub-atmospheric and atmospheric pressures, such as a Topler mercury vacuum pump or the apparatus described in my Patent No. 1348505, Ser. No. 228,732, filed April 15th, 1918. The tube 22 is also connected to a suction apparatus. Any suitable means designated 24 may be provided in the reservoir 15 for the purpose of providing a large surface wetted with the desiccating agent in order to promote the absorption of moisture.

Suction is applied to both the tubes 18 and 22, with the result that the liquid in tube 16 remains at the level $a$ and air in the remainder of the apparatus is partially evacuated. If now suction ceases through the tube 18 and atmospheric pressure is admitted, the liquid will shift to approximately the levels $b$—$b$. The liquid will also fill the tubes 20, 21 and 22 and partly fill the receiver 23. When suction is again exerted through the tube 18, the liquid tends to resume the levels *a*. The suction through the tube 22, however, retains liquid therein and while a certain amount is withdrawn by the counter suction, enough remains to form a seal in the U-tube, as indicated by the levels *d*. As the liquid tends to resume its level *a*, it naturally recedes from the tube 20, so that a perfect vacuum is created in this tube. When the liquid drops below the entrance of the tube 20, to approximately the levels *c*, the atmosphere above the liquid level equalizes with the vacuum. The means 24 in the reservoir is now left uncovered and wetted with the desiccating agent, so that a large absorption surface is presented, with the result that a great part of the vapor in the atmosphere is absorbed. When atmospheric pressure is re-admitted through the tube 18, the liquid rushes up to its levels *b* and as soon as it rises above the mouth of the tube 20, air therein is trapped. Continued rise of the liquid in the tube 20 expels the air through the tube 21 and through the liquid in the tube 22 and receiver 23. The operation continues automatically as just described until almost a perfect vacuum has been produced in the receptacle 11, the air removed being expelled and the vapor absorbed by the desiccating agent. Once the air has been removed, the atmosphere in the receiver 15 and receptacle 11 is solely aqueous vapor, which is absorbed by the desiccating agent. This absorption is very rapid, owing to the agent being exposed over the large area of the means 24 at each oscillation of the liquid. It is well known that when the pressure on a liquid is lowered, its boiling or evaporation point is correspondingly lowered. It is also well known that in the physical change known as evaporation a large amount of heat is absorbed. With the low pressures and consequent extremely rapid evaporation in the present apparatus, very low temperatures will be produced. It will therefore be necessary in many instances to provide sufficient heat to prevent freezing of the material dried, especially when this material is a readily freezable liquid. In such cases, any suitable heating apparatus 13 is utilized; the flame and temperature equalizing bath shown in the diagram being purely for purpose of illustration. By means of this apparatus, liquids in the receptacle 11 may be vigorously boiled at a temperature of 10° C., with the result that the discharge of water or other vapor will be very rapid.

An advantage of this invention is that the pressure in the apparatus is reduced to the vapor pressure of the desiccating agent, so that absorption of the extracted vapor is facilitated. As an example of the results produced by this method, it may be stated that at ordinary temperature, a month is required for a liter of water to be evaporated and absorbed in a liter of sulphuric acid, whereas according to this process, a liter of water at the same temperature may be evaporated and completely absorbed by a liter of sulphuric acid in approximately two and one-half hours. This invention presents further advantages, for example, when exhausting air to promote evaporation with a Topler mercury pump or a rotary pump, the suction apparatus soon becomes saturated with water films, after which there is great loss of efficiency, owing to the fact that the pressure is reduced only to that of water at the temperature at which the pump is operated. According to this invention, the water is absorbed and held by the suction apparatus and does not interfere with its operation. The air is automatically discharged at each operation of the liquid. A further great advantage of this invention is that it eliminates the last few millimeters pressure of air or inert gas in the apparatus, producing substantially a perfect vacuum. It has been of course known for a very long time that liquids evaporate more rapidly at low pressures, but it was thought that the last few millimeters of air or inert gas pressure in an evaporating apparatus did not effect evaporation and the maximum rate of evaporation had been obtained. I have discovered by experiment that the rate of evaporation is by no means proportional to the pressure and that if the last two or three millimeters of air or gas pressure can be removed, the rate of evaporation is very greatly increased. According to this process, the air or inert gas pressure in the apparatus is reduced substantially to zero and it is largely owing to this that the high rate of evaporation is contained. It will be understood that while the pressure of air or inert gas has been reduced to zero, there will nevertheless be the vapor pressure of the liquid evaporated in the apparatus. It must therefore be understood that the expression "vacuum," as used in this specification, is to be considered only as referring to the air or inert gas.

A considerable difficulty is experienced in preparing pure and uniform commercial solutions of sulphuric acid. According to this process, the acid solutions may be quickly and cheaply prepared by evaporating water. When other substances are being dried, of aqueous moisture, the dilute acid is automatically formed and the sale of this by-product will largely or wholly offset the cost of the drying operation.

Having thus described my invention, what I claim is;—

1. A process of drying, consisting in causing the vapors evolved from the material to be dried to contact with a desiccating surface, periodically wetting the surface with a vapor absorbing agent, by causing the agent to rise and fall over the desiccating surface, the fall of the agent creating a vacuum to expedite the rarefication of the vapors under treatment.

2. A process of drying consisting in causing the vapors evolved from the material to be dried to contact with an extensive desiccating surface, alternately raising and lowering the level of a desiccating liquid to periodically wet such surface, the movement of the liquid effecting a vacuum to assist in the rarefication of the atmosphere under treatment.

3. A process of drying consisting in causing the vapors evolved from the material to be dried to pass in contact with an extensive desiccating surface, periodically raising and lowering the level of a desiccating liquid to wet such surface, the receding action of the agent creating a vacuum which in conjunction with the desiccating agent effects rarefication of the atmosphere under treatment.

4. A process of drying, comprising distribution of a desiccating agent over a distributing surface, periodically renewing such distributed agent by causing the desiccating agent to rise and fall over the said surface, this movement of the agent simultaneously evacuating air from the vicinity of the material to be dried.

5. A process of drying comprising placing material to be dried in a closed vessel, communicating with a chamber having an extensive desiccating surface, periodically raising and lowering the level of a desiccating agent to wet such surface, the lowering movement of the agent serving to create a vacuum for the purpose of rapidly effecting a complete vacuum in such vessel, and heating the material to be dried sufficiently to prevent freezing by the accelerated evaporation.

6. A process according to claim 5 in which the heating is carried out at a temperature sufficient to boil the liquid treated at the reduced pressure.

7. A method for making dilute sulphuric acid which comprises placing water in a closed receptacle, communicating with a chamber having an extensive desiccating surface alternately raising and lowering the level of a column of sulphuric acid to periodically distribute such acid over said surface and to create a vacuum and heating the water to accelerate evaporation.

In witness whereof, I have hereunto set my hand.

OTTO MAASS.